March 29, 1949.    C. R. UNDERHILL, JR    2,465,764

OPTICAL UNIT WITH AIR EXPANSION MEANS

Filed Aug. 23, 1945

CHARLES R. UNDERHILL, JR.
INVENTOR

BY

ATTORNEY

Patented Mar. 29, 1949

2,465,764

UNITED STATES PATENT OFFICE 2,465,764

OPTICAL UNIT WITH AIR EXPANSION MEANS

Charles R. Underhill, Jr., Haddonfield, N. J., assignor to Radio Corporation of America, a corporation of Delaware Application August 23, 1945, Serial No. 612,184

3 Claims. (Cl. 88—24)

This invention relates to optical systems, and particularly to an optical unit for forming and projecting a narrow beam of light to a film for recording or reproducing sound waves.

In sound recording and reproducing systems, an optical unit is employed, the unit having a casing containing a plurality of lenses and a slit mask, all of which are pre-adjusted and assembled to form an integral unit. Many of these units are subject to changes in temperature extending over a wide range, particularly when used with motion picture projectors utilizing high intensity arc lamps as the source of light for the projector. It has been found that oil finds its way into these optical units, which not only forms an oil coating on the lenses themselves, but also sometimes fills the light slit itself to eliminate, almost completely, the light from the film. It has been found that the exciter lamp distills drops of oil falling on it, and there is, therefore, a heavy oil vapor in the vicinity of the condenser end of the optical unit. This oil vapor is drawn into the unit casing through the minute crevices between the condenser lens and its metal mount due to the difference between the co-efficient of expansion of the optical glass and the metal, and because of the large pressures or vacuums that exist within the lens casing with changes in temperature. Although special seals have been used, which do prevent liquid oil from seeping into the units, these seals are not always effective in preventing oil vapor from getting into the interior of the unit.

Thus, because of the heating and cooling cycles, the units "breathe"; that is, air is expelled through the seals when they are expanded by heat, and drawn in through the seals when the unit cools, oil vapor coming in during the cooling period. The oil collects and settles at the bottom of the casing, particularly at the condenser lens end of the casing. When the unit is again heated, this oil is not expelled, but on the next cooling cycle, more oil vapor is added, until it fills the casing up to the slit in the mask.

The present invention, therefore, is directed to a method of and means for permitting the optical unit to "breathe" by letting the air freely pass in and out of the casing with changes in temperature, and filtering the oil or oil vapor from the air as it is being drawn into the unit. In this manner, the accumulation of oil is avoided.

The principal object of the invention, therefore, is to improve the operation of an optical unit which is subjected to temperature variations.

Another object of the invention is to provide an improved optical unit which can operate in the presence of oil vapors without having the oil reach the interior of the unit.

A further object of the invention is to provide a breathing system for an optical unit which operates over a wide temperature range.

A still further object of the invention is to provide an optical unit with a breather system.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
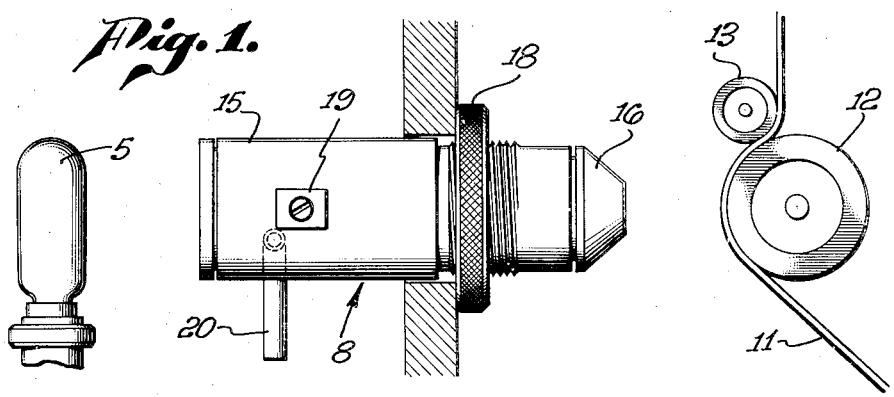
Fig. 1 is a diagrammatic view of the principal elements of a sound recording system showing an optical unit embodying the invention.
Figure 2:
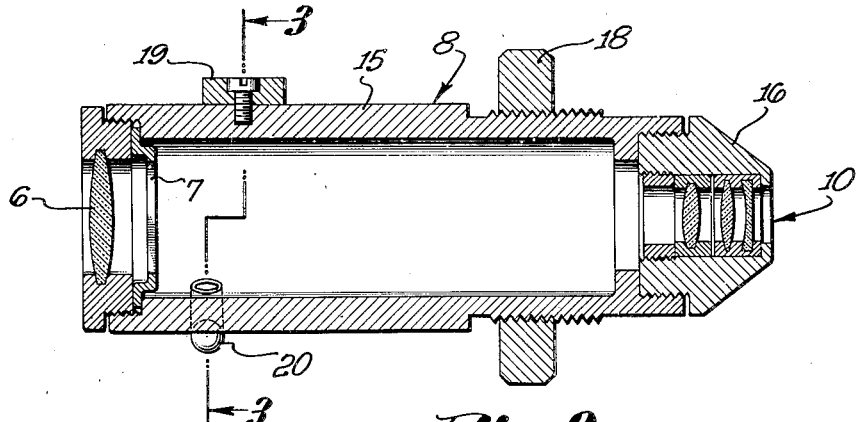
Fig. 2 is a cross sectional view of the optical unit of the system of Fig. 1, showing the invention.
Figure 3:
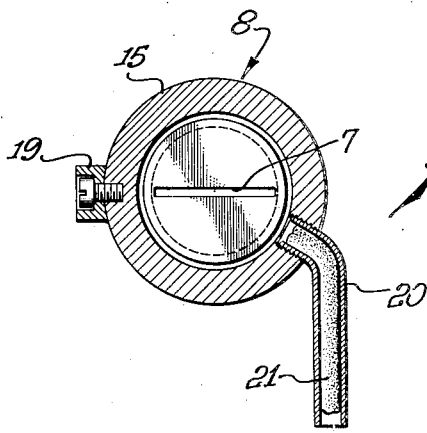
Fig. 3 is a cross sectional view of the units shown in Figs. 1 and 2, taken along the line 3—3 of Fig. 2.

Referring now to the drawings, in which the same numerals identify like elements, light from an exciter lamp 5 is collected, formed into a slit, and projected by an optical unit 8 having a condenser lens 6, a mask with a slit 7 therein, and a series of objective lenses 10. (See Fig. 2.) The image of the slit is projected to a film 11 passing over a roller 12 and under a pad roller 13. Since the drawing is of a sound reproducing system, light passing through the sound track area of the film is impressed on a photoelectric cell, not shown. The lamp 5 is a high intensity lamp, and, in addition to contributing directly to the heating of the optical unit 8, it also distills any oil falling thereon, and produces oil vapor in the vicinity of the unit. The unit is also heated through conduction from the picture projector, which is heated by the high intensity projection arc.

Referring to the specific construction of the unit 8, it will be noted that the slit mask ring abuts a shoulder of the barrel, and the collecting or condenser lens 6 is mounted in a ring threaded into one end of the barrel 15 against the mask ring. The other end of the barrel is closed by a threaded unit 16 in which lenses 10 are assembled. A knurled ring 18 is threaded on the outer right-hand portion of the barrel 15 for the purpose of longitudinally adjusting the unit along its optical axis. A block 19 is attached to one side of the barrel 15 for adjusting the orientation of the slit 7.

To permit the optical unit 8 to breathe, a metal or plastic tube 20 is threaded into the barrel 15 below its center, the tube being bent downwardly. Within the tubing 20 is inserted a filter material 21, which may be of several types, such as cleaning tissue, blotting paper, cotton, or even the type of filters used in smoking pipes. Since the tube is bent downwardly, the air drawn into the barrel 15 when the unit cools will come from a relatively cool area of the soundhead, where it contains less oil content than the air immediately surrounding the unit and present at the seals. With the pressure removed at the seals, due to the free passage of air into and out of the barrel, and with the air filtered of oil as it passes into the barrel, the interior of the barrel is maintained free of oil even when the unit is operating in the presence of oil vapors.

The filter may be incorporated in new optical units being constructed, while present optical units of the type shown in the drawings, and now in use, may be quickly modified to permit them to breathe.

I claim:

1. An optical unit for a motion picture unit having a lamp adapted to heat said optical unit comprising a hollow barrel, lens mounts threaded into the ends of said barrel to form a substantially air-tight enclosure, an open ended tube mounted on the wall of said barrel and communicating through said barrel for permitting air to be expelled from and drawn into the interior of said barrel during expansions and contractions, respectively, of the air within said barrel, and means within said tube for filtering oil vapor and dust from air passing into said barrel.

2. An optical unit in accordance with claim 1, in which said tube passes through said barrel below the center thereof, the free end of said tube being positioned below said barrel in a comparatively cool region of said motion picture unit.

3. An optical unit comprising a substantially cylindrical, hollow barrel, lens mounts threaded into the ends of said barrel to form a substantially air-tight enclosure, said optical barrel being subject to variations in temperature which expands and contracts the air within said barrel, an open-ended tube extending through the wall of said barrel to permit air to pass to and from the interior of said barrel during expansions and contractions of the air within said barrel, and filtering means within said tube.

CHARLES R. UNDERHILL, Jr.

REFERENCES CITED

The following references are of record in the file of this patent:

UNITED STATES PATENTS

| Number | Name | Date |
| --- | --- | --- |
| 767,624 | Bedell et al. | Aug. 16, 1904 |
| 832,219 | Spear | Oct. 2, 1906 |
| 867,982 | Lake | Oct. 15, 1907 |
| 1,175,609 | Cottrell | Mar. 14, 1916 |
| 1,839,217 | Greiback | Jan. 5, 1932 |
| 2,002,352 | Owens | May 21, 1935 |
| 2,005,068 | Batsel | June 18, 1935 |
| 2,037,739 | Safranski | Apr. 21, 1936 |
| 2,118,716 | Wager | May 24, 1938 |
| 2,164,747 | Landis | July 4, 1939 |
| 2,323,787 | Bitner | July 6, 1943 |